(12) United States Patent
Shen et al.

(10) Patent No.: US 9,817,506 B2
(45) Date of Patent: Nov. 14, 2017

(54) SENSOR ARRAY CONFIGURATIONS FOR DIFFERENTIAL READOUT

(71) Applicant: Synaptics Incorporated, San Jose, CA (US)

(72) Inventors: Guozhong Shen, San Jose, CA (US); Ozan Ersan Erdogan, San Jose, CA (US); Yongqian Tang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 252 days.

(21) Appl. No.: 14/675,018

(22) Filed: Mar. 31, 2015

(65) Prior Publication Data

US 2016/0291765 A1 Oct. 6, 2016

(51) Int. Cl.
*G06F 3/041* (2006.01)
*G06F 3/044* (2006.01)
*G06K 9/00* (2006.01)

(52) U.S. Cl.
CPC ............ *G06F 3/0416* (2013.01); *G06F 3/044* (2013.01); *G06K 9/0002* (2013.01); *G06K 9/00013* (2013.01); *G06F 2203/04107* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 7,053,633 B2 | 5/2006 | Hara | |
| 7,078,918 B2 | 7/2006 | Umeda et al. | |
| 7,099,496 B2 | 8/2006 | Benkley, III | |
| 7,102,364 B2 | 9/2006 | Umeda et al. | |
| 7,298,875 B2 | 11/2007 | Kim et al. | |
| 7,570,789 B2 | 8/2009 | Fujiyoshi | |
| 7,667,468 B1 | 2/2010 | Anderson | |
| 8,005,276 B2 | 8/2011 | Dean et al. | |
| 8,115,497 B2 | 2/2012 | Gozzini | |
| 8,116,540 B2 | 2/2012 | Dean et al. | |
| 8,237,453 B2 | 8/2012 | Badaye et al. | |
| 8,410,795 B1 | 4/2013 | Peng et al. | |

(Continued)

OTHER PUBLICATIONS

U.S. Appl. No. 14/674,623, filed Mar. 31, 2015.
U.S. Appl. No. 14/788,200, filed Jun. 30, 2015.

*Primary Examiner* — Patrick Edouard
*Assistant Examiner* — Matthew Yeung
(74) *Attorney, Agent, or Firm* — Leydig, Voit & Mayer, Ltd.

(57) ABSTRACT

A sensor array for capacitive sensing includes: a plurality of sensor electrodes, the plurality of sensor electrodes comprising: a plurality of transmitter electrodes and a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes; wherein each of the plurality of transmitter electrodes is configured to be driven by sensing signals and each of the plurality of receiver electrodes is configured to receive detected signals corresponding to the sensing signals driven onto the transmitter electrodes; and conductive shielding disposed proximate to the reference receiver electrode.

20 Claims, 7 Drawing Sheets

(56) References Cited

U.S. PATENT DOCUMENTS

| | | |
|---|---|---|
| 8,421,890 B2 | 4/2013 | Benkley, III |
| 8,638,107 B2 | 1/2014 | Schwartz et al. |
| 8,791,792 B2 | 7/2014 | Benkley, III |
| 8,810,543 B1 | 8/2014 | Kurikawa |
| 8,866,347 B2 | 10/2014 | Benkley, III |
| 8,888,004 B2 | 11/2014 | Setlak et al. |
| 8,970,546 B2 | 3/2015 | Schwartz et al. |
| 2004/0247163 A1 | 12/2004 | Hara |
| 2005/0141263 A1 | 6/2005 | Umeda et al. |
| 2006/0049834 A1 | 3/2006 | Umeda |
| 2006/0158202 A1 | 7/2006 | Umeda et al. |
| 2008/0069413 A1 | 3/2008 | Riedijk et al. |
| 2009/0123039 A1 | 5/2009 | Gozzini |
| 2009/0252386 A1 | 10/2009 | Dean et al. |
| 2009/0267903 A1 | 10/2009 | Cady et al. |
| 2009/0314621 A1* | 12/2009 | Hotelling .............. G06F 3/0416 200/600 |
| 2010/0052700 A1* | 3/2010 | Yano ..................... G06F 3/044 324/658 |
| 2010/0156795 A1 | 6/2010 | Kim et al. |
| 2010/0309162 A1* | 12/2010 | Nakanishi .............. G06F 3/044 345/174 |
| 2010/0328255 A1 | 12/2010 | Ishizaki et al. |
| 2011/0141051 A1 | 6/2011 | Ryu |
| 2011/0148435 A1* | 6/2011 | Schwartz .............. G06F 3/0416 324/658 |
| 2012/0032895 A1 | 2/2012 | Westerman et al. |
| 2012/0092350 A1* | 4/2012 | Ganapathi .......... G02B 26/0833 345/501 |
| 2013/0076692 A1* | 3/2013 | Saitou .................... G06F 3/044 345/174 |
| 2013/0113730 A1 | 5/2013 | Lo et al. |
| 2013/0177220 A1 | 7/2013 | Erhart et al. |
| 2013/0265137 A1 | 10/2013 | Nelson et al. |
| 2013/0271422 A1 | 10/2013 | Hotelling et al. |
| 2013/0271426 A1 | 10/2013 | Yumoto et al. |
| 2013/0286301 A1* | 10/2013 | Moon ................. G02F 1/13338 349/12 |
| 2013/0314109 A1 | 11/2013 | Kremin et al. |
| 2014/0152324 A1 | 6/2014 | Schwartz et al. |
| 2014/0210764 A1 | 7/2014 | Shepelev |
| 2015/0030217 A1 | 1/2015 | Wickboldt et al. |

* cited by examiner

SENSOR ARRAY CONFIGURATIONS FOR DIFFERENTIAL READOUT

BACKGROUND

Input devices including proximity sensor devices (also commonly called touchpads or touch sensor devices), as well as fingerprint sensors, are widely used in a variety of electronic systems. Proximity sensor devices typically include a sensing region, often demarked by a surface, in which the proximity sensor device determines the presence, location and/or motion of one or more input objects. Fingerprint sensors also typically include a sensing region in which the fingerprint sensor determines presence, location, motion, and/or features of a fingerprint or partial fingerprint.

Proximity sensor devices and fingerprint sensors may be used to provide interfaces for the electronic system. For example, proximity sensor devices and fingerprint sensors are often used as input devices for larger computing systems (such as opaque touchpads and fingerprint readers integrated in, or peripheral to, notebook or desktop computers), as well as relatively smaller computing systems (such as touch screens and fingerprint readers integrated in cellular phones). Such devices and sensors are often susceptible to a variety of types of noise. In certain instances, signal quality is significantly degraded if such noise is not rejected by the system.

SUMMARY

In an exemplary embodiment, an input device for capacitive sensing includes: a plurality of sensor electrodes, the plurality of sensor electrodes comprising: a plurality of transmitter electrodes and a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes; wherein each of the plurality of transmitter electrodes is configured to be driven by sensing signals and each of the plurality of receiver electrodes is configured to receive detected signals corresponding to the sensing signals driven onto the transmitter electrodes; conductive shielding disposed proximate to the reference receiver electrode; and a processing system, the processing system configured to receive the detected signals from each of the plurality of receiver electrodes, and further configured to generate modified detected signals based on the received detected signals at the imaging receiver electrodes and the received detected signals at the reference receiver electrode.

In another exemplary embodiment, an input device for capacitive touch sensing includes: a plurality of sensor electrodes, the plurality of sensor electrodes comprising: a plurality of transmitter electrodes and a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes; wherein each of the plurality of transmitter electrodes is configured to be driven by sensing signals and each of the plurality of receiver electrodes is configured to receive detected signals corresponding to the sensing signals driven onto the transmitter electrodes; and a processing system, the processing system configured to receive the detected signals from each of the plurality of receiver electrodes, and further configured to generate modified detected signals based on the received detected signals at the imaging receiver electrodes and the received detected signals at the reference receiver electrode; wherein portions of the plurality of transmitter electrodes proximate to where the reference receiver electrode overlaps with the transmitter electrodes are thinner than portions of the plurality of transmitter electrodes proximate to where each of the plurality of receiver electrodes overlaps with the imaging receiver electrodes.

In yet another exemplary embodiment, a sensor array for capacitive sensing includes: a plurality of sensor electrodes, the plurality of sensor electrodes comprising: a plurality of transmitter electrodes and a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes; wherein each of the plurality of transmitter electrodes is configured to be driven by sensing signals and each of the plurality of receiver electrodes is configured to receive detected signals corresponding to the sensing signals driven onto the transmitter electrodes; and conductive shielding disposed proximate to the reference receiver electrode.

DETAILED DESCRIPTION

The following detailed description is merely exemplary in nature. There is no intention to be bound by any expressed or implied theory presented in the present disclosure.

Particularly in fingerprint sensors, or other sensors where the pattern being sensed is likely to cover a large portion of the sensor, noise is introduced throughout (e.g., finger-coupled noise in the case of fingerprint sensors). Rejection of such noise by sensor device allows for better signal quality to be obtained for the pattern being sensed (e.g., for a fingerprint or any other pattern).

One way of addressing the noise introduced throughout the sensor by the presence of the object being detected is to utilize differential measurement on individual receiver lines relative to the average of multiple other receiver lines. This allows for noise common to multiple receiver lines to be canceled out based on the differential measurement. However, the use of multiple other receiver lines as a reference, which is a pattern-dependent reference, may introduce distortions into the detected image. For example, in a fingerprint sensor, when a ridge or a valley on the fingerprint spans all of the receiver lines, there may be no difference between the reading on one receiver line and the average of the rest of the receiver lines, such that the fingerprint sensor is unable to determine whether a ridge or a valley is present.

Such image distortions cannot be corrected by baseline image subtraction, code division multiplexing (CDM), or measuring temporal noise.

In an exemplary embodiment of a sensor assembly according to the principles described herein, this drawback of using a pattern-dependent reference may be avoided by using a fixed reference, with the sensor assembly configured such that the fixed reference is less sensitive to the pattern to be detected relative to receiver lines in an imaging area of the sensor assembly.

Further, with respect to exemplary fingerprint identification applications, this exemplary embodiment further allows for improvements in terms of false acceptance rate (FAR) or false rejection rate (FRR). It will thus be appreciated that this exemplary embodiment is particularly advantageous in applications such as fingerprint identification, fingerprint imaging, and other sensing applications where the pattern being sensed is able to cover both a reference line and imaging receiver lines. It will further be appreciated that the described sensor configurations are also usable in other types of proximity sensor devices (e.g., capacitive touch pad sensors) as well to facilitate reduction of system-based noise.

Figure 1:
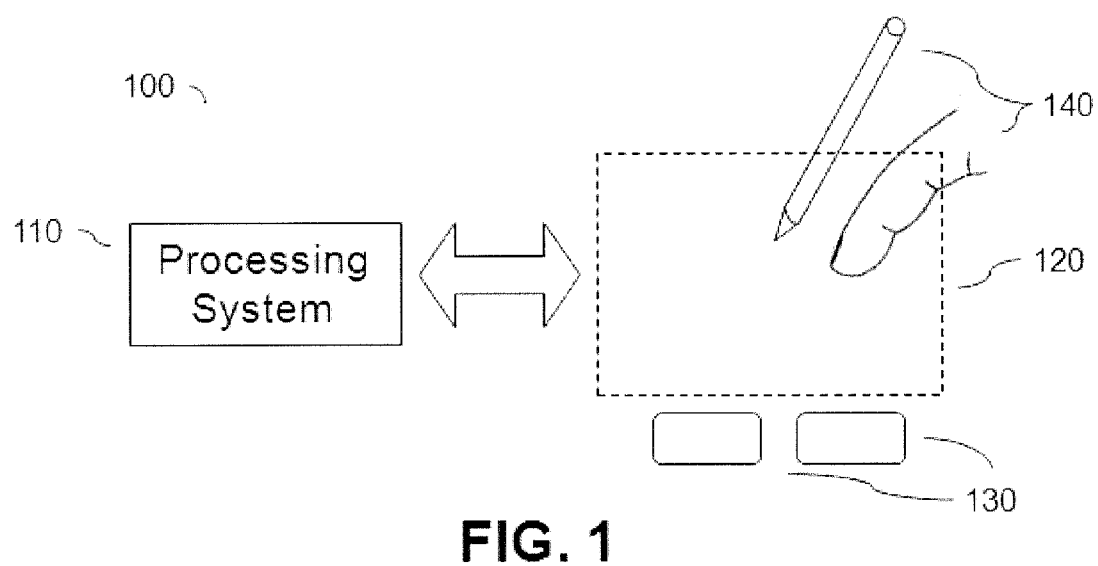
FIG. 1 is a block diagram of an exemplary environment for an input device such as a touchpad sensor.

Turning now to the figures, FIG. 1 is a block diagram of an exemplary environment for an input device 100, usable in accordance with various configurations of the sensors described herein. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. For example, the input device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "TX electrodes") and one or more receiver sensor electrodes (also "receiver electrodes" or "RX electrodes"). Transmitter sensor electrodes may be modulated relative to a reference voltage to transmit transmitter signals. In various embodiments, the reference voltage may be a substantially constant voltage, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It will be appreciated that embodiments described herein are also usable in environments utilizing "self-capacitance" techniques. "Self-capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system 110.

Figure 2:
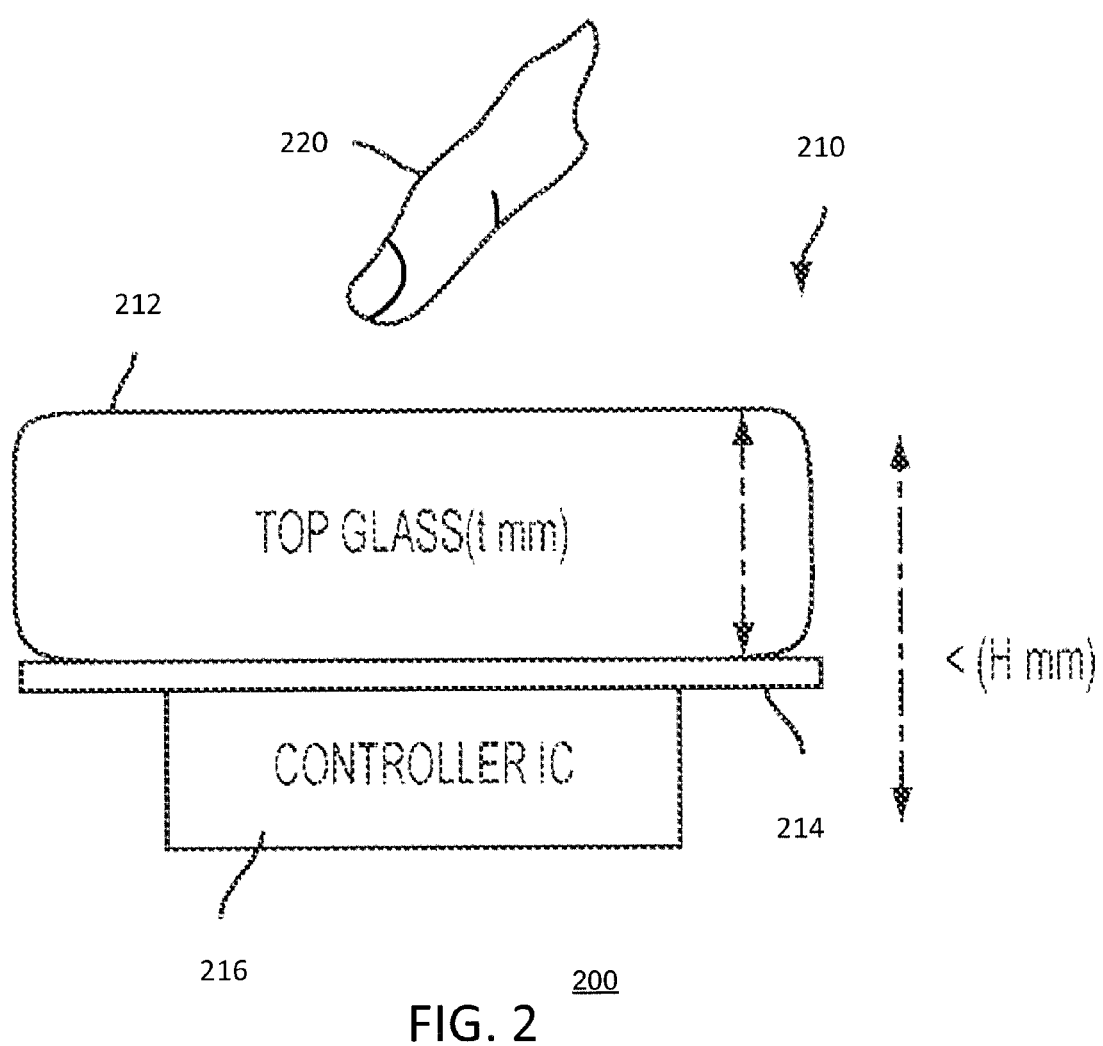
FIG. 2 is a block diagram of an exemplary environment for an input device such as a biometric sensor.

FIG. 2 illustrates a block diagram 200 of another exemplary environment. Included is an example of a biometric sensor 210 for sensing a biometric, such as a fingerprint from a user finger 220. The sensor may be formed on the surface of a top glass 212, which may be part of a display screen, such as a touch screen. The sensor for a fingerprint sensor or other biometric sensor may be implemented, for example, using differential readout schemes as described herein. In other embodiments, the sensor may be located on a button, or in a dedicated fingerprint sensing location. According to the illustrated embodiment, on the underside of the glass layer 212 over which the finger 220 of the user may be placed or swiped, may be formed a layer 214 of material, which may be a dielectric and may be flexible, such as a film of Kapton® tape, which may have sensor element electrodes/traces formed on one or both opposing surfaces and may also have mounted thereon, e.g., by a chip on film (COF) or flip chip mounting technique, a sensor controller IC 216 to the substrate containing the sensor element electrodes/traces. As noted in this application, for some embodiments, the entire assembly may be on the order of less than 1 mm in thickness H, e.g., on the order of 0.1 mm in thickness, especially for COF types of packaging when considered without the thickness of the IC, such as when the IC is separate from the sensor. Also, depending on acceptable signal level, the thickness may be on the order of 2 mm or even thicker, e.g., for flip chip mounting packages. While one implementation of a fingerprint sensor is illustrated in FIG. 2, it should be appreciated that sensors according to the exemplary embodiments described herein may be beneficially utilized in a wide variety of fingerprint sensor designs and implementations.

Figure 3:
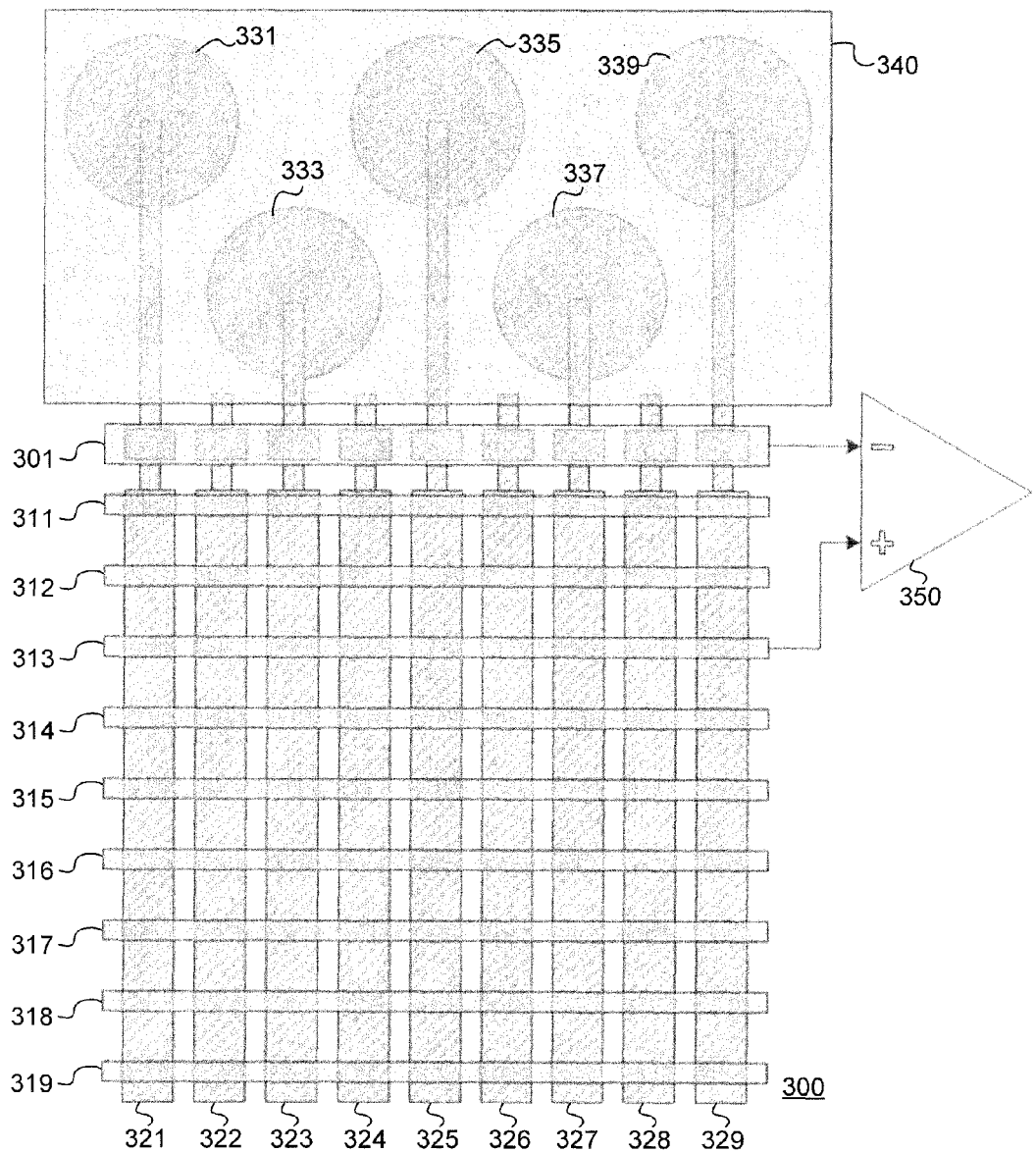
FIG. 3 is a schematic diagram illustrating a sensor array of an input device.

FIG. 3 illustrates sensor array 300 according to an exemplary embodiment. The sensor array 300 includes a plurality of sensor electrodes, including a reference receiver electrode 301, a plurality of imaging receiver electrodes 311-319, and a plurality of transmitter electrodes 321-329. The reference receiver electrode 301 and the imaging receiver electrodes 311-319 overlap with the plurality of transmitter electrodes 321-329 so as to form an imaging area having a two-dimensional array of capacitive gaps. Each intersection between an imaging receiver electrode and a transmitter electrode is a pixel of the imaging area.

The sensor electrodes may be connected to a controller IC in a variety of ways. In the illustrated example, the sensor electrodes are carried by a substrate, and vias are routed through the substrate to connect the sensor electrodes to a controller IC on an opposing side. Specifically, the transmitter electrodes 321, 323, 325, 327 and 329 are connected at one end to a plurality of vias 331, 333, 335, 337 and 339 which connect the sensor electrodes to the controller IC through the substrate. The transmitter electrodes 322, 324, 326 and 328 are also connected at one end to a plurality of vias (not depicted in FIG. 3). The vias 331, 333, 335, 337 and 339 depicted in FIG. 3 correspond to a top edge of the sensor, and the other vias are disposed in a bottom edge of the sensor (not depicted). These vias are connected to various transmitter pads of a controller IC, which, for example, may be mounted under the sensor. With respect to the components illustrated in FIG. 3, the top and bottom edges are provide similar functionality, so only the top edge of the sensor is shown for clarity of depiction.

It will be appreciated that the manner of connection using vias depicted in FIG. 3 is merely an example. In alternate embodiments (not depicted in FIG. 3), other configurations, such as a chip-on-film (COF) (or "chip-on-flex") configuration may be used to form the sensor electrodes on a substrate and connect them to a controller IC, in which case the sensor configuration might not include the depicted vias.

A conductive shielding 340 is disposed proximate to the reference receiver electrode 301. The conductive shielding 340 is configured to block at least a portion of the electric fields generated from the transmitter electrodes that extend into a region over the reference receiver electrode, where an object is introduced to the imaging surface (without impacting or without significantly impacting the electric fields generated from the transmitter electrodes that extend into a region over the imaging receiver electrodes). This allows the reference receiver electrode to be less sensitive to specific features of the object being imaged to provide a relatively consistent reference, while still allowing the reference receiver electrode to pick up noise introduced by the object and allowing the imaging receiver electrodes to be sensitive enough to discern between the specific features of the object. In the example of fingerprint imaging, the reference receiver electrode is less sensitive to whether a ridge or valley of the fingerprint is present at the reference receiver electrode, while the readings taken from the imaging receiver electrodes allow for such distinctions to be detected. In the specific example depicted in FIG. 3, the conductive shield is disposed on the opposite side of the reference receiver electrode relative to the imaging array (over the vias), and may be positioned, for example, coplanar with the reference receiver electrode, or possibly another position between the imaging surface and the transmitter electrodes.

Additionally, a processing system, including at least one differential amplifier 350 (e.g., a low-noise amplifier), is connected to the array of electrodes. It will be appreciated that although only one differential amplifier is depicted, one or more differential amplifiers may be utilized as part of the processing system (e.g., different pairs of receiver electrodes may correspond to differential amplifiers or may correspond to the same differential amplifier in various implementations, depending on how the receiver electrodes are connected to the differential amplifiers).

In operation, the sensor array 300 has sensing signals (e.g., voltage pulses) driven onto the transmitter electrodes (e.g., onto one transmitter electrode at a time, or in some instances multiple transmitter electrodes at a time). Based on these sensing signals, corresponding signals are received by the reference receiver electrode 301 and/or one or more of the imaging receiver electrodes 311-319. For example, in an implementation where differential readings for each pixel are taken relative to a corresponding reading at the reference receiver electrode, the reading at the reference receiver electrode is input into a first channel of the differential amplifier 350 and the reading at an imaging receiver electrode (corresponding to a pixel being read) is input into a second channel of the differential amplifier 350. The differential amplifier 350 then generates a modified detected signal based thereon, which allows the processing system to, for example, determine whether or not a biometric object such as a finger is present and/or to determine features of the biometric object such as the presence of ridges or valleys for a fingerprint.

As discussed above, in an exemplary embodiment, the sensor array 300 is configured such that readings taken on the reference receiver electrode 301 are less sensitive to features of a biometric object present on a sensing surface corresponding to the sensor array, relative to the imaging receiver electrodes 311-319, which are more sensitive to features of the biometric object. For example, when a finger is placed on the sensing surface, regardless of whether a ridge or valley of the finger is present at the overlap between the reference receiver electrode 301 and an active transmitter electrode, the signal change corresponding to the finger pattern received via the reference receiver electrode 301 will be substantially minimized. On the other hand, at the overlap between an imaging receiver electrode 301 and an active transmitter electrode, there would be a substantial difference in the received reading on the imaging receiver electrode based on whether a ridge or valley is present at that overlap. This allows the processing system to effectively distinguish between different features of the biometric object at each pixel of the imaging area, while utilizing readings from the reference receiver electrode to account for system-wide noise, including noise introduced by the presence of the biometric object on the sensing surface. These embodiments thus provide for the generation of accurate and precise images of the sensed biometric object, with lower false acceptance and false rejection rates when the signal is used for biometric matching.

Figure 4:
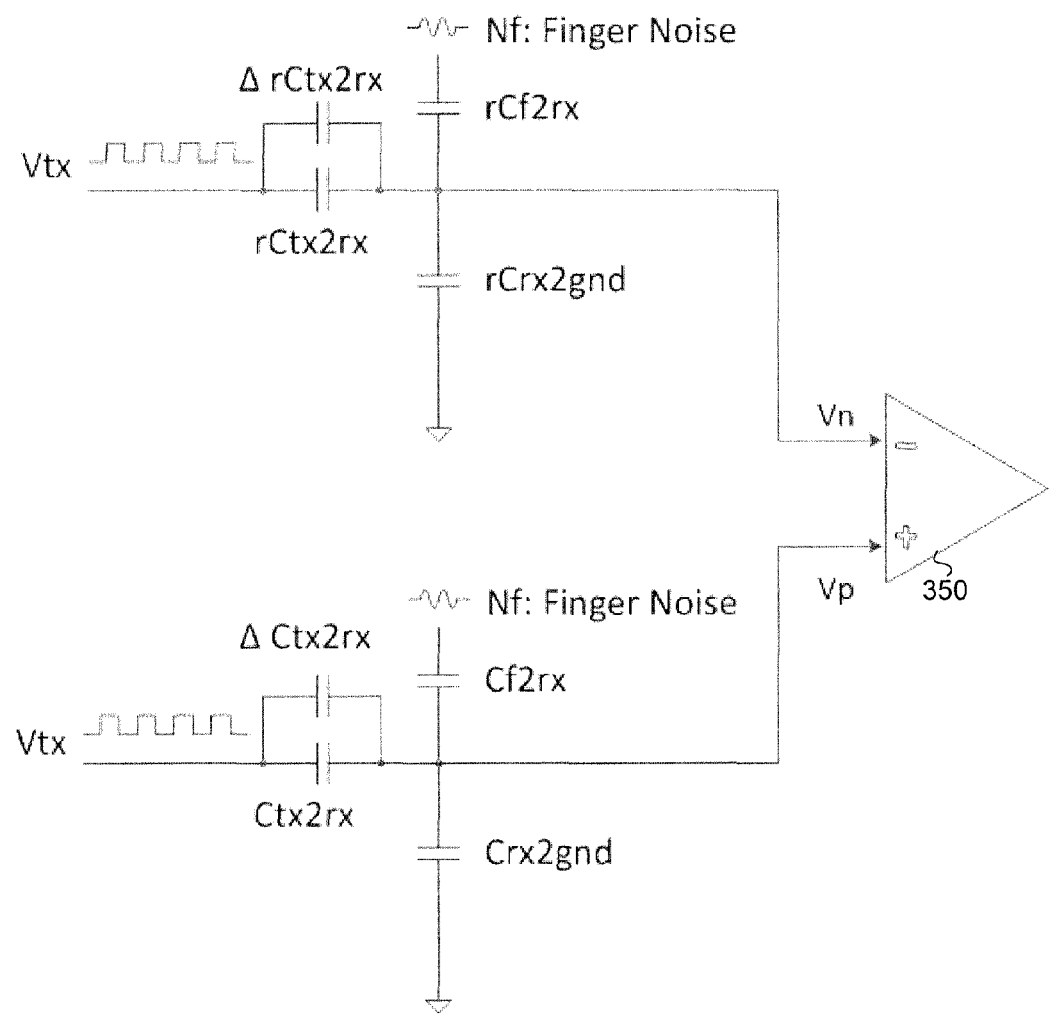
FIG. 4 is a circuit diagram illustrating an electrical model corresponding to the input device.

To further explain these principles, FIG. 4 illustrates an electrical model in the form of a circuit diagram 400 showing different capacitances involved when a biometric object, such as a finger is placed onto a sensing surface and a pixel of the imaging area is read relative to the reference receiver electrode. As illustrated in FIG. 4, the presence of the biometric object (in this case, for example, a finger) on the sensing area produces a capacitance between the finger and the reference receiver electrode (rCf2rx), as well as a capacitance between the finger and the imaging receiver electrode corresponding to the pixel being read (Cf2rx). The presence of the biometric object also causes a substantially similar amount of noise to be introduced at both of those receiver electrodes.

There is also a capacitance between the active transmitter electrode and the reference receiver electrode (rCtx2rx) based on the capacitive gap at the overlap between the electrodes, which is reduced by an amount (ΔrCtx2rx) when the biometric object is introduced onto the sensing surface. There is similarly a capacitance between the active transmitter electrode and the imaging receiver electrode corresponding to the pixel being read (Ctx2rx) based on the capacitive gap at the overlap between the electrodes, which is reduced by an amount (ΔCtx2rx) when the biometric object is introduced onto the sensing surface. There are also capacitances between the reference receiver electrode and ground (rCrx2gnd) and between the imaging receiver electrode and ground (Crx2gnd).

These capacitance values affect the two inputs into the differential amplifier, which are signals received on the receiver electrodes based on the sensing signals driven onto the transmitter electrode. Namely, Vn, which is input into a first channel of the differential amplifier, is affected by rCf2rx, rCtx2rx, ΔrCtx2rx, and rCrx2gnd, while Vp, which is input into a second channel of the differential amplifier, is affected by Cf2rx, Ctx2rx, ΔCtx2rx, and Crx2gnd. The differential amplifier outputs a modified detected signal for the pixel being read corresponding to a difference between Vp and Vn.

The difference between Vp and Vn, disregarding certain higher-order parameters that are negligible, can be modeled as follows in Equation 1.

$$Vp - Vn = Vtx \left[ \frac{Ctx2rx}{Crx2gnd + Ctx2rx + Cf2rx} - \frac{rCtx2rx}{rCrx2gnd + rCtx2rx + rCf2rx} \right] + Vtx \left[ \frac{\Delta Ctx2rx}{Crx2gnd + Ctx2rx + Cf2rx} - \frac{\Delta rCtx2rx}{rCrx2gnd + rCtx2rx + rCf2rx} \right] + Nf \left[ \frac{Cf2rx}{Crx2gnd + Ctx2rx + Cf2rx} - \frac{rCf2rx}{rCrx2gnd + rCtx2rx + rCf2rx} \right] \qquad \text{Equation 1}$$

The portion of this difference attributable to the noise caused by introduction of the biometric object is the third part of Equation 1.

$$Nf \left[ \frac{Cf2rx}{Crx2gnd + Ctx2rx + Cf2rx} - \frac{rCf2rx}{rCrx2gnd + rCtx2rx + rCf2rx} \right] \qquad \text{Equation 1.3}$$

Thus, to utilize the reference receiver electrode to minimize the system-wide noise introduced by the biometric object, the two terms within the brackets, $$\frac{Cf2rx}{Crx2gnd + Ctx2rx + Cf2rx}$$

and $$\frac{rCf2rx}{rCrx2gnd + rCtx2rx + rCf2rx},$$

should be as close to each other as possible.

At the same time, the reference receiver electrode should be less sensitive to features of the biometric object than the imaging receiver electrode. This is accomplished by maximizing the second part of Equation 1.

$$Vtx \left[ \frac{\Delta Ctx2rx}{Crx2gnd + Ctx2rx + Cf2rx} - \frac{\Delta rCtx2rx}{rCrx2gnd + rCtx2rx + rCf2rx} \right] \qquad \text{Equation 1.2}$$

This is accomplished by minimizing the value of the $$\frac{\Delta rCtx2rx}{rCrx2gnd + rCtx2rx + rCf2rx}$$

term relative to the $$\frac{\Delta Ctx2rx}{Crx2gnd + Ctx2rx + Cf2rx}$$

term.

In an exemplary implementation, the sensor array of FIG. 3 is configured such that the $$\frac{\Delta rCtx2rx}{rCrx2gnd + rCtx2rx + rCf2rx}$$

term has a value of 10% or less of the $$\frac{\Delta Ctx2rx}{Crx2gnd + Ctx2rx + Cf2rx}$$

term, while maintaining substantially similar values for the $$\frac{Cf2rx}{Crx2gnd + Ctx2rx + Cf2rx}$$

and $$\frac{rCf2rx}{rCrx2gnd + rCtx2rx + rCf2rx}$$

terms.

Another consideration is the first part of Equation 1, which relates to the common mode signal attributable to the sensing signals driven onto the transmitter electrode.

$$Vtx\left[\frac{Ctx2rx}{Crx2gnd + Ctx2rx + Cf2rx} - \frac{rCtx2rx}{rCrx2gnd + rCtx2rx + rCf2rx}\right] \quad \text{Equation 1.1}$$

By maintaining $$\frac{Ctx2rx}{Crx2gnd + Ctx2rx + Cf2rx}$$

close to $$\frac{rCtx2rx}{rCrx2gnd + rCtx2rx + rCf2rx},$$

the common mode signal entering the differential amplifier will be minimized. However, the differential amplifier itself may include an offset compensation circuit to help remove the common mode signal, so there is some tolerance for the two terms of Equation 1.1 to not be made substantially equal.

Turning back to FIG. 3, it can be seen that the width of the transmitter electrodes is relatively thin proximate to the overlaps between the reference receiver electrode and the transmitter electrodes. In an example, the reduced width of the transmitter electrodes proximate to the overlaps with the reference receiver electrode is 15 µm (relative to having 50 µm width proximate to the overlaps with the imaging receiver electrodes). This results in a reduction in the ΔrCtx2rx term from Equation 1.2 above, making the reference receiver electrode less sensitive to features of the biometric object. Additionally, the presence of the conductive shielding proximate to the reference receiver electrode further reduces the ΔrCtx2rx term. The conductive shielding may be grounded or may be held to a fixed voltage. Increasing the size of the reference receiver electrode also reduce the sensitivity of the reference receiver electrode by increasing the "rCrx2gnd+rCtx2rx+rCf2rx" term in Equation 1.2.

Figure 5:
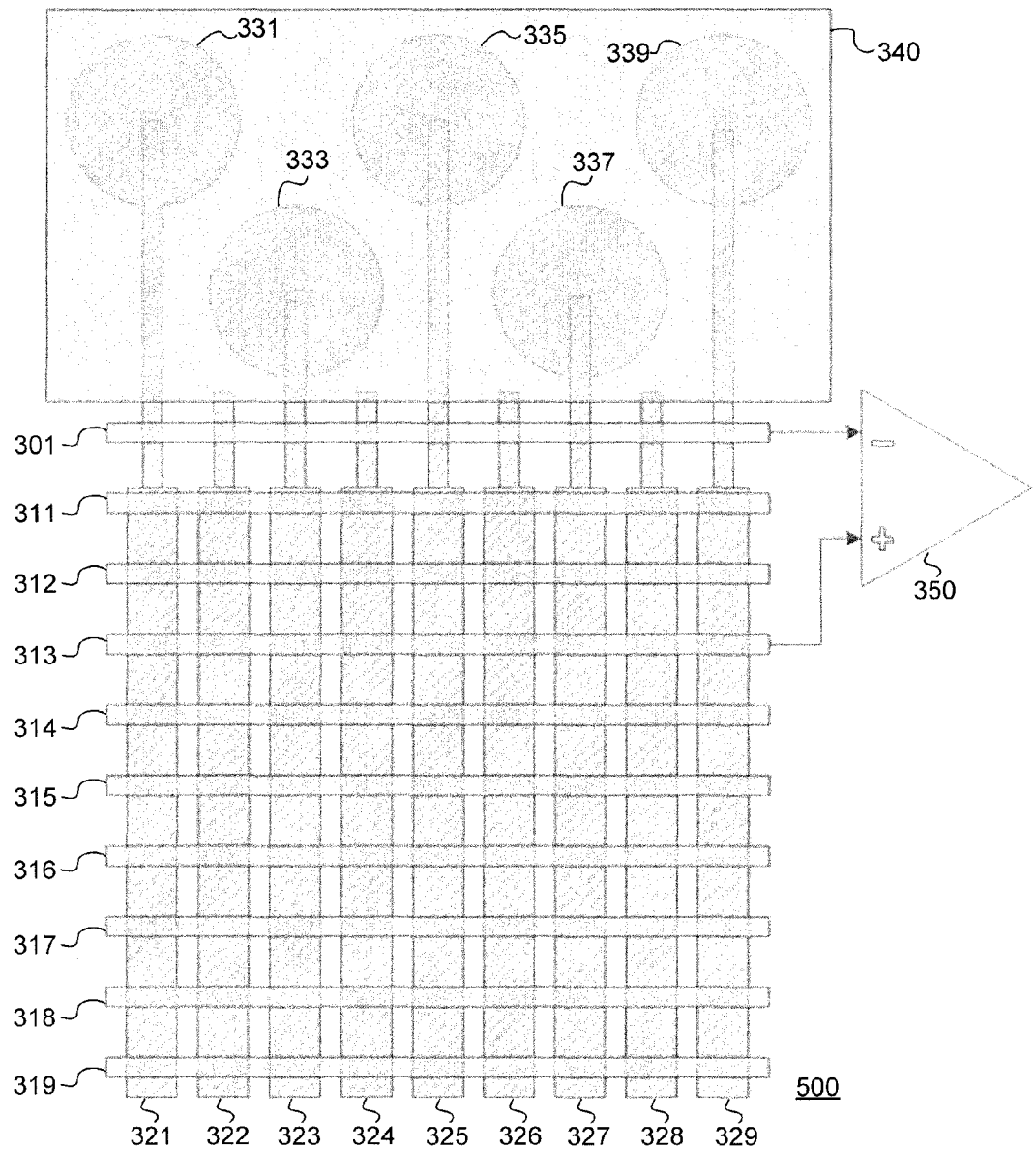
FIG. 5 is a schematic diagram illustrating a sensor array of an input device.

FIG. 5 illustrates another exemplary embodiment of a sensor array 500, where the reference receiver electrode 301 is not depicted as being wider than the other receiver electrodes, but the reference receiver electrode 301 is disposed proximate to the conductive shielding 340 (e.g., down to 20 µm) such that the distance between the reference receiver electrode and the conductive shielding is relatively smaller than the spacing between adjacent imaging receiver electrodes of the plurality of imaging receiver electrodes.

It will also be appreciated that these differences in FIG. 5, which are illustrated with respect to a top edge of the sensor, may similarly be applied with respect a bottom edge of the sensor. For example, in an exemplary implementation where one reference channel on the top edge is used with respect to half of the receiver channels and another reference channel on the bottom edge is used with respect to the other half of the receiver channels, the components corresponding to both edges of the sensor may be similarly configured.

Although not depicted in FIG. 5, decreasing the spacing between the reference receiver electrode 301 and a first imaging receiver electrode 311 also has the effect of decreasing the sensitivity of the reference receiver electrode to a biometric pattern placed on the sensing area.

Figure 6:
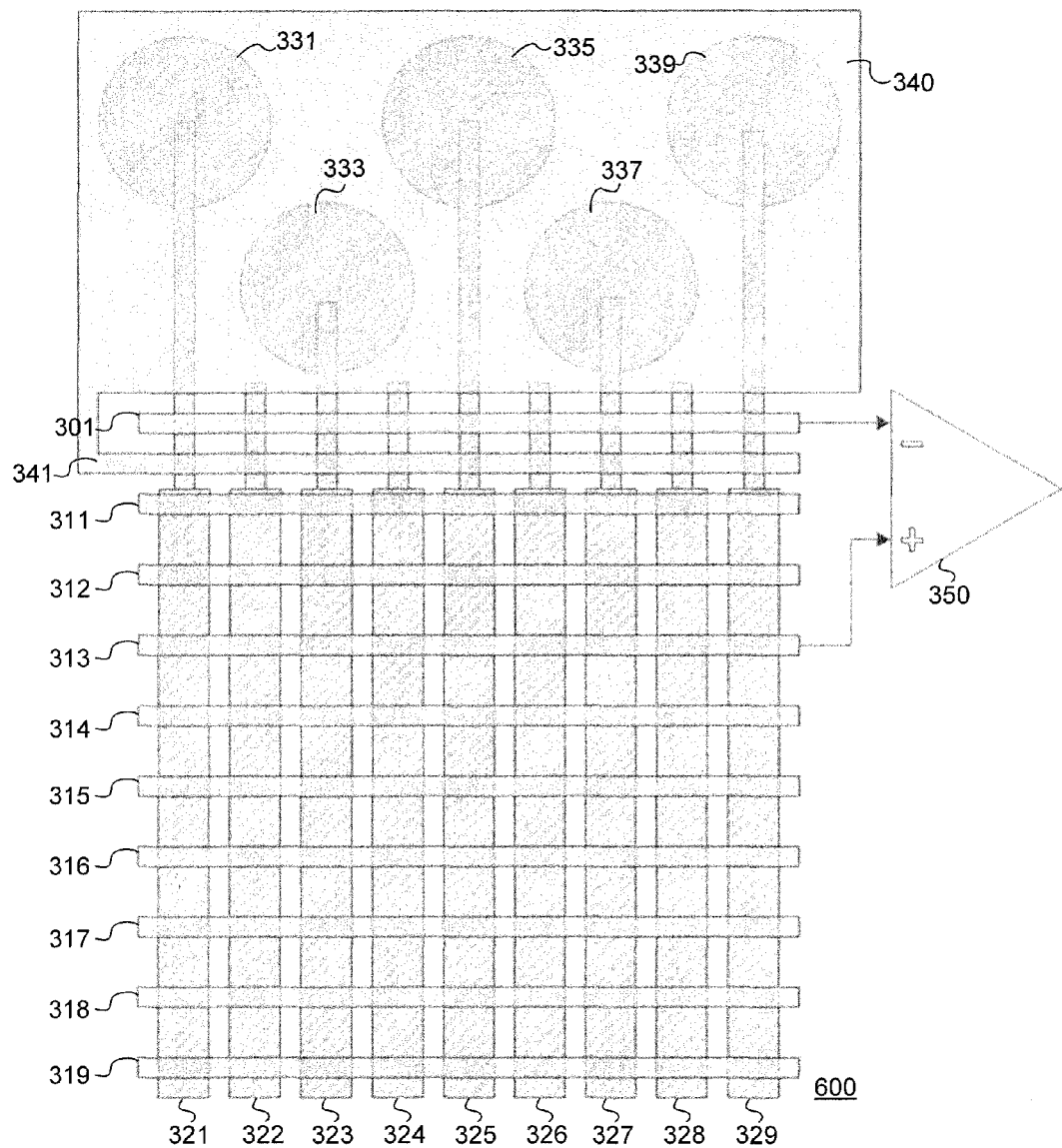
FIG. 6 is a schematic diagram illustrating a sensor array of an input device.

FIG. 6 illustrates yet another exemplary embodiment of a sensor array 600, where the conductive shielding 340 further includes an additional portion 341 that is disposed between the reference receiver electrode 301 and a first imaging receiver electrode 311.

Figure 7:
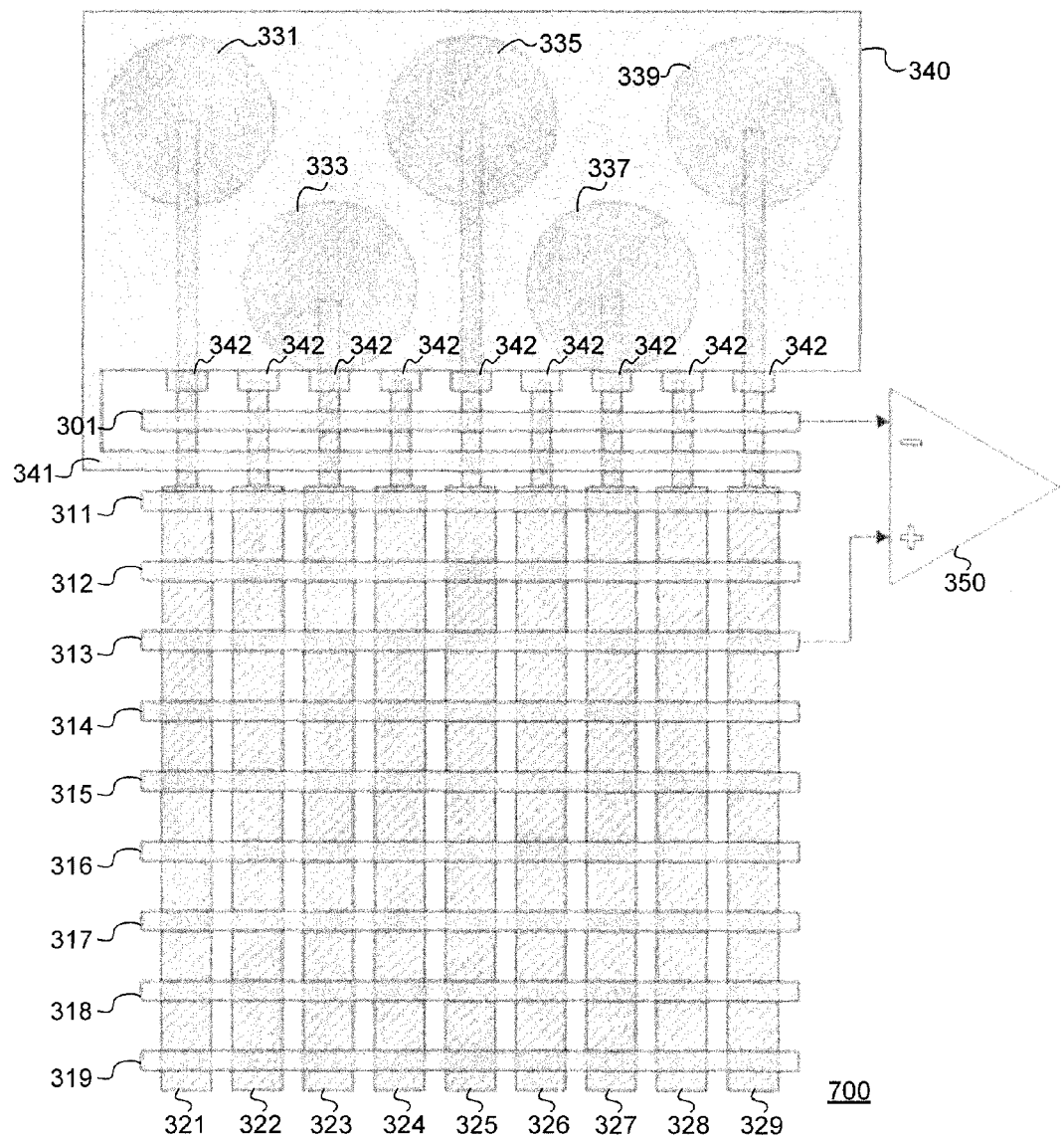
FIG. 7 is a schematic diagram illustrating a sensor array of an input device.

FIG. 7 illustrates yet another exemplary embodiment of a sensory array 700, where the conductive shielding 340 further includes a plurality of protrusions 342 disposed in alignment with the plurality of transmitter electrodes. In an exemplary implementation, the protrusions have a length of 30 µm and a width of 40 µm.

The exemplary features discussed above in the exemplary embodiments depicted in FIGS. 3, 5, 6 and 7 provide for rejection of finger-coupled common mode noise (i.e., the noise introduced by the finger onto the reference receiver electrode is also present on the other receiver electrodes), as well as providing a reference channel (corresponding to the reference receiver electrode) that is less sensitive to any particular feature of a fingerprint relative to the sensitivities of the other receiver electrodes. For example, by adding a shield proximate to the reference receiver electrode, by making the transmission electrode relatively thin, and/or by incorporating other features discussed herein, the amount of field lines transmitted from the transmission electrode to the receiver electrode that reach the sensing region is reduced for the reference receiver electrode, and the reference receiver electrode is less sensitive to the fingerprint features (e.g., ridges or valleys) in the sensing region that can disrupt these field lines. This causes the value of ΔrCtx2rx to be effectively reduced, while at the same time maintaining the capability to reject common mode noise and finger-coupled noise.

The use of the terms "a" and "an" and "the" and "at least one" and similar referents in the context of the description and the claims are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Variations of the exemplary embodiments discussed herein may become apparent to those of ordinary skill in the art upon reading the foregoing description. The inventors expect skilled artisans to employ such variations as appropriate, and the inventors intend for the principles described herein to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for capacitive sensing, comprising:
   a plurality of sensor electrodes, the plurality of sensor electrodes comprising:
      a plurality of transmitter electrodes, and
      a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes;
   wherein each of the plurality of transmitter electrodes is configured to be driven by sensing signals and each of the plurality of receiver electrodes is configured to receive detected signals corresponding to the sensing signals driven onto the transmitter electrodes;
   conductive shielding disposed proximate to the reference receiver electrode; and
   a processing system, the processing system being configured to receive the detected signals from each of the plurality of receiver electrodes, and further configured to generate modified detected signals based on the received detected signals at the imaging receiver electrodes and the received detected signals at the reference receiver electrode;
   wherein the reference receiver electrode is disposed between at least a portion of the conductive shielding and a first imaging receiver electrode of the plurality of imaging receiver electrodes, and wherein the conductive shielding is configured to block at least a portion of the electric fields generated by the transmitter electrodes from extending into a region over the reference receiver electrode.

2. The input device according to claim 1, wherein the conductive shielding comprises a first portion on one side of the reference receiver electrode and a second portion on an opposite side of the reference receiver electrode, wherein the second portion of the conductive shielding is disposed between the reference receiver electrode and the first imaging receiver electrode of the plurality of imaging receiver electrodes.

3. The input device according to claim 1, wherein the conductive shielding comprises a plurality of protrusions, each of the protrusions being aligned with a respective transmitter electrode of the plurality of transmitter electrodes.

4. The input device according to claim 1, wherein portions of the plurality of transmitter electrodes proximate to where the reference receiver electrode overlaps with the transmitter electrodes are thinner than portions of the plurality of transmitter electrodes proximate to where each of the plurality of receiver electrodes overlaps with the imaging receiver electrodes.

5. The input device according to claim 1, wherein the plurality of imaging receiver electrodes overlap with the plurality of transmitter electrodes to form an imaging area having a two-dimensional array of capacitive gaps.

6. The input device according to claim 1, wherein the processing system comprises a differential amplifier having a first input channel configured to receive resulting reference signals from the reference receiver electrode and a second input channel configured to receive resulting signals from one or more of the plurality of imaging receiver electrodes.

7. The input device according to claim 1, wherein the reference receiver electrode is wider than each of the plurality of imaging receiver electrodes.

8. The input device according to claim 1, wherein a distance between the reference receiver electrode and the conductive shielding is smaller than a distance between two imaging receiver electrodes of the plurality of imaging receiver electrodes.

9. The input device according to claim 1, wherein a distance between the reference receiver electrode and the first imaging receiver electrode of the plurality of imaging receiver electrodes is smaller than a distance between two imaging receiver electrodes of the plurality of imaging receiver electrodes.

10. The input device according to claim 1, wherein the plurality of sensor electrodes are configured to form a first capacitor having a first capacitance (rCf2rx) between the reference receiver electrode and a biometric object placed in proximity to the input device, a second capacitor having a second capacitance (rCrx2gnd) between the reference receiver electrode and ground, a third capacitor having a third capacitance (rCtx2rx) between the reference receiver electrode and a transmitter electrode, a fourth capacitor having a fourth capacitance (Cf2rx) between an imaging receiver electrode and the biometric object, a fifth capacitor having a fifth capacitance (Crx2gnd) between the imaging receiver electrode and ground, and a sixth capacitor having a sixth capacitance (Ctx2rx) between the imaging receiver electrode and the transmitter electrode.

11. The input device according to claim 10, wherein the plurality of capacitors are configured such that a first ratio $$\frac{rCf2rx}{rCrx2gnd + rCtx2rx}$$

is substantially equal to a second ratio $$\frac{Cf2rx}{Crx2gnd + Ctx2rx}.$$

12. The input device according to claim 1, wherein the conductive shielding is disposed over a plurality of vias connected to the plurality of transmitter electrodes.

13. The input device according to claim 1, wherein the plurality of sensor electrodes are configured to capture an image of a fingerprint.

14. The input device of claim 1, wherein the conductive shielding is configured to be grounded while the plurality of transmitter electrodes are driven by the sensing signals.

15. The input device of claim 1, wherein the processing system is configured to apply a fixed voltage to the conductive shielding while the plurality of transmitter electrodes are driven by the sensing signals.

16. A sensor array for capacitive sensing, comprising:
a plurality of sensor electrodes, the plurality of sensor electrodes comprising:
a plurality of transmitter electrodes, and
a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes;
wherein each of the plurality of transmitter electrodes is configured to be driven by sensing signals and each of the plurality of receiver electrodes is configured to receive detected signals corresponding to the sensing signals driven onto the transmitter electrodes; and
conductive shielding disposed proximate to the reference receiver electrode;
wherein the reference receiver electrode is disposed between at least a portion of the conductive shielding and a first imaging receiver electrode of the plurality of imaging receiver electrodes, and wherein the conductive shielding is configured to block at least a portion of the electric fields generated by the transmitter electrodes from extending into a region over the reference receiver electrode.

17. The input device according to claim 1, wherein the conductive shielding is configured so as not to block electric fields generated by the transmitter electrodes from extending into a region over the first imaging receiver electrode, or so as to block a smaller amount of electric fields generated by the transmitter electrodes from extending into the region over the first imaging receiver electrode relative to the amount of electric fields generated by the transmitter electrodes blocked from extending into the region over the reference receiver electrode.

18. A sensor array for capacitive sensing, comprising:
a plurality of sensor electrodes, the plurality of sensor electrodes comprising:
a plurality of transmitter electrodes, and
a plurality of receiver electrodes, wherein the plurality of receiver electrodes include a plurality of imaging receiver electrodes and a reference receiver electrode, and wherein each of the plurality of receiver electrodes overlaps with the plurality of transmitter electrodes;
wherein each of the plurality of transmitter electrodes is configured to be driven by sensing signals and each of the plurality of receiver electrodes is configured to receive detected signals corresponding to the sensing signals driven onto the transmitter electrodes; and
conductive shielding disposed proximate to the reference receiver electrode;
wherein the plurality of sensor electrodes are configured to form a first capacitor having a first capacitance (rCf2rx) between the reference receiver electrode and a biometric object placed in proximity to the sensor array, a second capacitor having a second capacitance (rCrx2gnd) between the reference receiver electrode and ground, a third capacitor having a third capacitance (rCtx2rx) between the reference receiver electrode and a transmitter electrode, a fourth capacitor having a fourth capacitance (Cf2rx) between an imaging receiver electrode and the biometric object, a fifth capacitor having a fifth capacitance (Crx2gnd) between the imaging receiver electrode and ground, and a sixth capacitor having a sixth capacitance (Ctx2rx) between the imaging receiver electrode and the transmitter electrode.

19. The sensor array according to claim 18, wherein the plurality of capacitors are configured such that a first ratio $$\frac{rCf2rx}{rCrx2gnd + rCtx2rx}$$

is substantially equal to a second ratio $$\frac{Cf2rx}{Crx2gnd + Ctx2rx}.$$

20. The sensor array according to claim 18, wherein the third capacitance (rCtx2rx) is reduced by a first amount (ΔrCtx2rx) due to the biometric object being placed in proximity to the sensory array, the sixth capacitor (Ctx2rx) is reduced by a second amount (ΔrCtx2rx) due to the biometric object being placed in proximity to the sensory array, and $$\frac{\Delta rCf2rx}{rCrx2gnd + rCtx2rx + rCf2rx}$$

is less than $$\frac{\Delta Ctx2rx}{Crx2gnd + Ctx2rx + Cf2rx}.$$

\* \* \* \* \*